ELECTRIC ACCUMULATORS FOR USE WITH RECORD CONTROLLED STATISTICAL MACHINES

Filed April 15, 1954 5 Sheets-Sheet 1

Inventors
MAURICE C. P. HEWITT & DONALD P. LAMBERT,
By
Attorney

March 26, 1957 M. C. P. HEWITT ET AL 2,786,631

ELECTRIC ACCUMULATORS FOR USE WITH RECORD CONTROLLED STATISTICAL MACHINES

Filed April 15, 1954 5 Sheets-Sheet 2

Inventors

MAURICE C. P. HEWITT & DONALD P. LAMBERT,

By

March 26, 1957 M. C. P. HEWITT ET AL 2,786,631

ELECTRIC ACCUMULATORS FOR USE WITH RECORD CONTROLLED STATISTICAL MACHINES

Filed April 15, 1954 5 Sheets-Sheet 3

Inventors
MAURICE C. P. HEWITT & DONALD P. LAMBERT,
By [signature]
Attorney

Inventors
MAURICE C. P. HEWITT & DONALD P. LAMBERT,
By
Attorney

Inventors
MAURICE C. P. HEWITT & DONALD P. LAMBERT,
By [signature]
Attorney

United States Patent Office 2,786,631
Patented Mar. 26, 1957

2,786,631

ELECTRIC ACCUMULATORS FOR USE WITH RECORD CONTROLLED STATISTICAL MACHINES

Maurice Charles Paton Hewitt, South Croydon, and Donald Paul Lambert, Carshalton, England, assignors to Powers-Samas Accounting Machines Limited, London, England, a British company Application April 15, 1954, Serial No. 423,485

Claims priority, application Great Britain April 28, 1953

11 Claims. (Cl. 235—133)

This invention relates to electrical accumulators for use with statistical machines controlled by records such as perforated record cards, or perforated tape, or by cards, tape, or other data-bearing media on which data is recorded by marks, for example marks having magnetic properties or light-absorbing properties, and from which data is sensed for transmission to the accumulator.

According to the present invention an electircal accumulator comprises a plurality of rotatable denominational counter units arranged to receive discrete digit-representing pulses entered in parallel into the respective units, a carry circuit connecting each unit with the unit of next higher denomination, means operative in succession to a digit-entering operation to apply a carry pulse simultaneously to all carry circuits conditioned for a carry operation, and a standing-on-maximum switch included in the carry circuit to each said unit and operable by rotation of the unit of next lower denomination to condition the carry circuit to receive said carry pulse when during the application of the carry pulse said unit of next lower denomination is moved from the standing-on-maximum registering condition thereof to the zero registering condition thereof.

Figure 1:
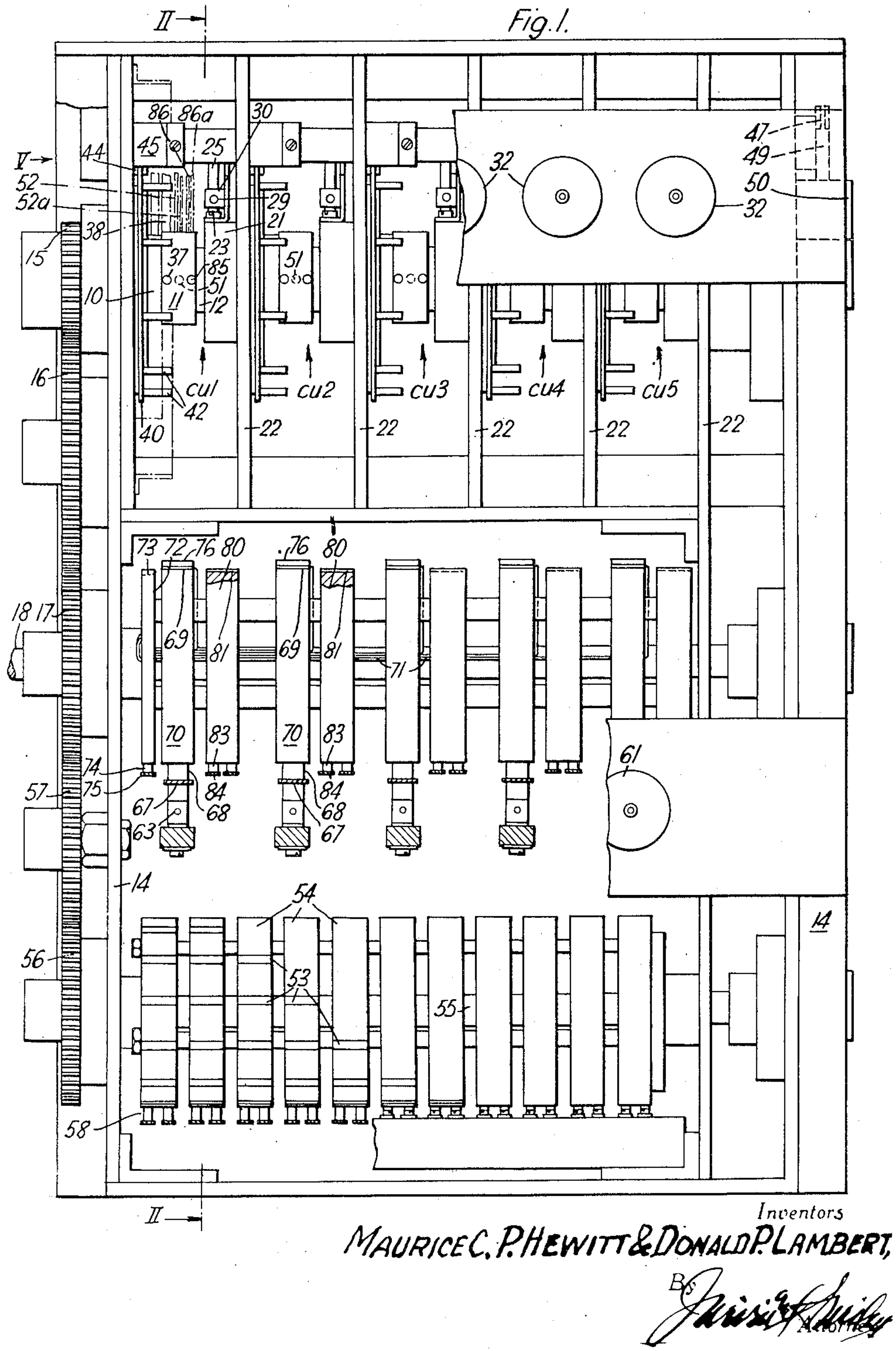
Figure 2:
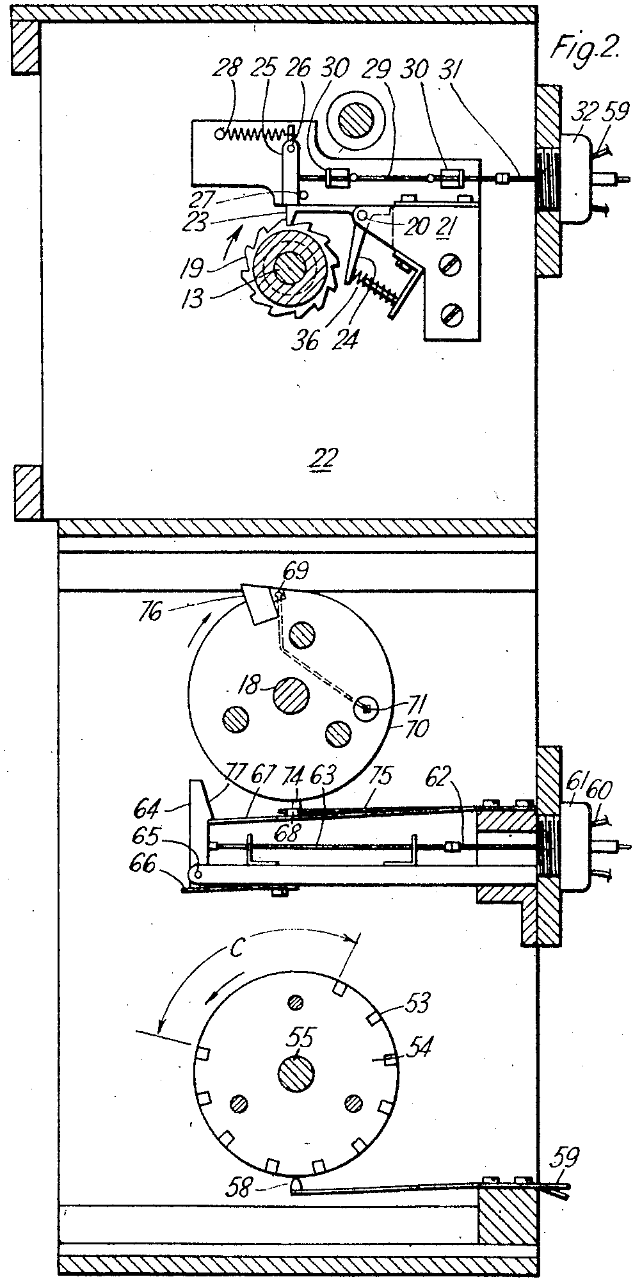
Figure 4:
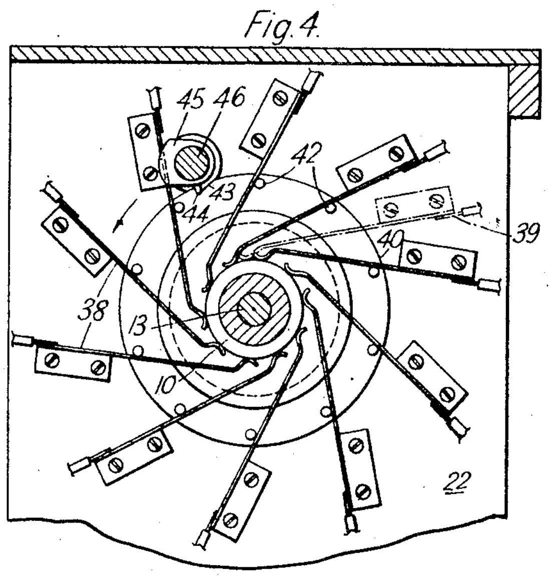
Figure 3:
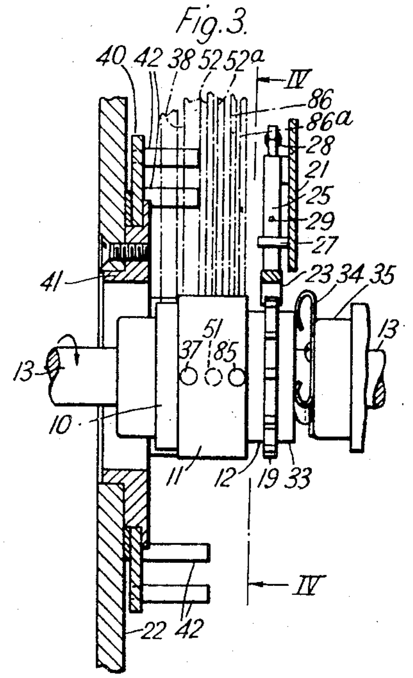
Figure 5:
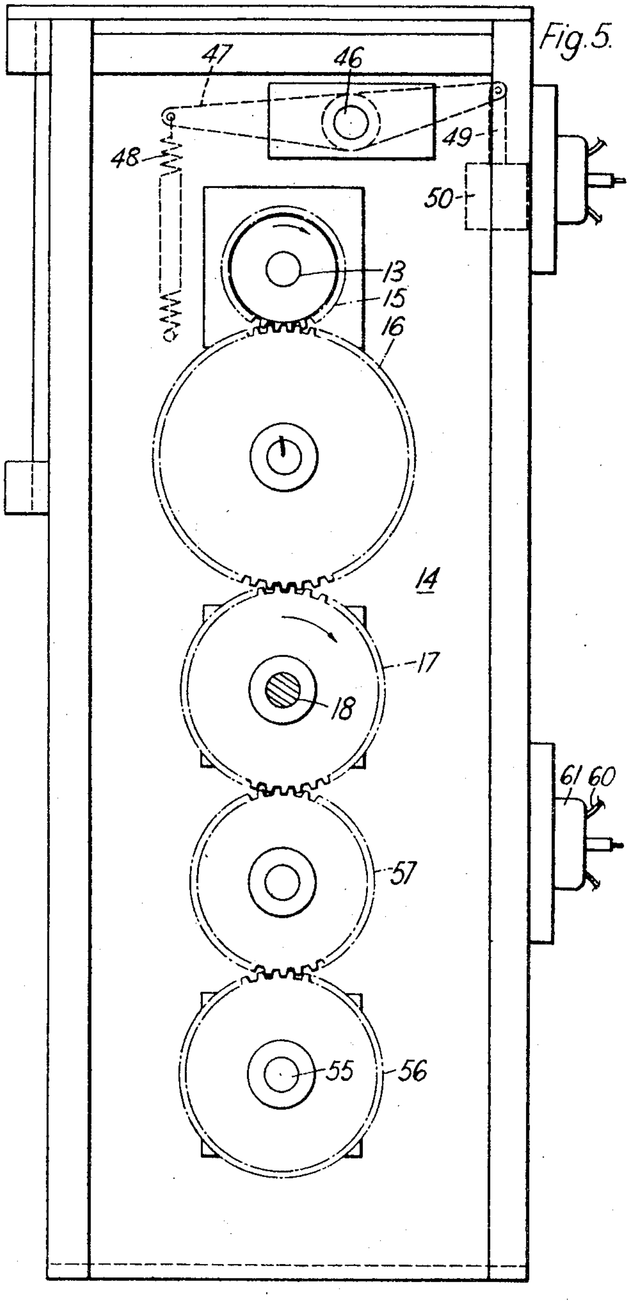
Figure 6:
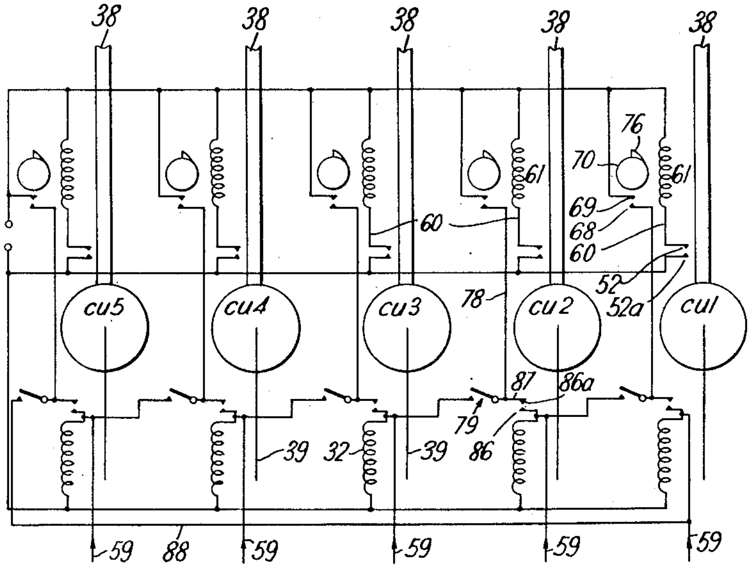

In order that the invention may be clearly understood one embodiment thereof will now be described, by way of example, with reference to the accompanying diagrammatic drawings in which:

Fig. 1 is an elevation of one form of accumulator to which the invention may be applied, Fig. 2 is a section on line II—II, Fig. 1, Fig. 3 is a view, partly in section, of one counter unit embodied in the accumulator illustrated in Fig. 1, Fig. 4 is a section on line IV—IV, Fig. 3, Fig. 5 is a view of Fig. 1, looking in the direction of arrow V, Fig. 1, and Fig. 6 is a circuit diagram illustrating the manner in which, in accordance with the invention, carries are effected from a counter unit of one denomination to the counter unit of next higher denomination.

In Fig. 1 there is illustrated an accumulator comprising counter units CU1, CU2, CU3, CU4, and CU5 of which unit CU1 is to register pence, unit CU2 is to register shillings, unit CU3 is to register tens-of-shillings, unit CU4 is to register units of pounds and unit CU5 is to register tens-of-pounds. It will be understood that, if desired, other units may be provided, to the right of unit CU5, to record higher denominational values of pounds. It will also be understood that, if desired, the accumulator may be arranged so that the units thereof register decimal amounts in which case, unit CU1 will register digits to the power of $10^0$, unit CU2 will register digits to the power of $10^1$, unit CU3 will register digits to the power of $10^2$, unit CU4 will register digits to the power of $10^3$, and unit CU5 will register digits to the power of $10^4$ and additional units may be provided to register digits of higher denominational values.

Each of the counter units CU1, CU2, CU3, CU4, and CU5 comprises an electrically conducting ring 10, Figs.

1 and 3, and a non-conducting ring 11 co-axial therewith, the rings being carried by and secured to a support 12, Fig. 3, freely mounted on a shaft 13, the shaft 13 being supported by frame members 14 and arranged for continuous rotation by gear wheels 15, 16 of which the latter meshes with a gear wheel 17 carried by a shaft 18 continuously driven from the main drive of the machine by any suitable means not shown.

Each support 12 has integral therewith a toothed wheel 19, Figs. 2 and 3, the number of teeth on the wheel being determined by the notational value ascribed to the counter unit of which it is a part, for example if the counter unit is a decimal unit each wheel 19 has ten teeth, but if it is a duo-decimal counter unit the wheel 19 has twelve teeth, as shown in Fig. 2. It will be understood that the wheel 19 for the tens-of-shillings counter unit has two teeth only, or it may have a plurality of teeth, being a predetermined multiple of two.

Each wheel 19 is restrained against rotation with the shaft 13 by a bell-crank lever pivoted at 20, Fig. 2, to a bracket 21 secured to a frame upright 22. The bell-crank lever has a tooth-engaging arm 23 and a restoring arm 24 and forms part of an escapement device. The tooth-engaging arm 23 of the bell-crank lever is normally retained in tooth-engaging relation with the wheel 19 by a latch 25 pivoted at 26 to bracket 21, the latch being urged towards a stop pin 27 and into latching engagement with arm 23 by a spring 28. The remainder of the escapement device consists of a wire 29 supported for axial movement by brackets 30 and engaged by the armature 31 of a moving coil solenoid 32 which received discrete electrical pulses as the result of the sensing of a number in a column of a record, for example a record card, appropriated thereto. From Fig. 1 it will be observed that a solenoid 32 is provided for each counter unit and discrete pulses resulting from the sensing of a record are entered in parallel to the respective solenoids.

Secured to the wheel 19 is a friction disc 33, Fig. 3, engaged by a spider spring 34 carried by a collar 35 secured to the shaft 13 for rotation therewith. When a discrete pulse is received by solenoid 32 the latter is energized and its armature 31 moves wire 29, to the left as viewed in Fig. 2, so that latch 25 is disengaged thereby from arm 23 whereupon a spring 36, Fig. 2, engaging arm 24 rocks arm 23 out of engagement with wheel 19 so that frictional engagement between disc 33 and spider spring 34 causes the wheel 19 to be moved angularly with shaft 13. Since rings 10 and 11 and wheel 19 are secured to support 12, angular movement of wheel 19 is also imparted to rings 10 and 11. The wheel 19, however, advances only by an increment of one tooth pitch because the tooth of the wheel which next approaches arm 24 during angular movement of the wheel engages arm 24 and rocks it counter-clockwise, as viewed in Fig. 2, so that arm 23 is restored to engagement with wheel 19 and is again latched by the latch 25 due to the action of spring 28.

Number-determining means formed by number-indicating contacts 37, Figs. 1 and 3, is connected to the conducting ring 10 and extends radially through the non-conducting ring 11 to co-operate with read-out brushes 38 of which, for each counting unit, there is one representative of zero and one for each numerical value to be registered by the counter unit. In Fig. 4, which is considered to illustrate the units of shillings counter unit CU2, there are ten read-out brushes 38 of which one is to read-out zero registrations and the others are respectively to read out registrations of numerical values "1" to "9". The electrical circuit of each counter unit includes an output brush 39 which permanently engages the conducting ring 10. The read-out brushes 38 are resilient elements which are urged towards the non-conducting rings 11 and which, except during a reading-out operation, are restrained by trip means against engagement with the ring 11.

The trip means comprises a disc 40, Figs. 1, 3 and 4, freely mounted for angular movement about a flange 41, Fig. 3, fixed to the frame member 22 and having pins 42 extending laterally therefrom. The disc 40 has a peripheral notch 43, Fig. 4, engaged by a projection 44 extending from an element 45 secured to a read-out shaft 46 supported for rocking movement in the frame members 14. To one end of the shaft 46 is secured a two-armed lever 47, Fig. 5, one arm being connected to a spring 48 and the other to the armature 49 of a moving coil solenoid 50. During a registering operation the spring 48 acts on shaft 46 so that it is rocked clockwise, as viewed in Fig. 5, thus through projection 44 urging disc 40 clockwise so that the pins 43 retain the read-out brushes 38 out of engagement with the non-conducting ring 11.

On initiation of a reading-out operation an electrical pulse is applied to solenoid 50, said pulse being initiated in any suitable manner as by the sensing of a control hole in a record card. On application of the said pulse to the solenoid 50, the latter is energised to draw downwards its armature 49 thereby rocking shaft 46 against the action of spring 48. When shaft 46 is so rocked, the projection 44 is moved counterclockwise, as viewed in Fig. 4, and the disc 40 is similarly moved owing to the resilient pressure exerted by the read-out brushes as, being no longer subject to the restraint exercised by projection 42, they move to engage the non-conducting ring 11 as shown in Fig. 4. When so moved, one of the brushes 38 will be engaged by the number-indicating contact 37, thus completing an electrical circuit indicative of the value registered according to the value ascribed to the brush 38 which is in engagement with the number-indicating contact, the circuit when completed being employed to control the making of a record of the amount registered. It will be understood that the number-indicating contact 37 can only be engaged by one brush 38 at any one time and that the brush so engaged is determined by the position in which the contact 37 has stopped as the result of pulses transmitted to the actuating solenoid 32 cooperating therewith.

Each non-conducting ring 11 also has inserted in it a carry contact 51, Figs. 1 and 3, which extends through the non-conducting ring 11 to co-operate with the carry brushes 52 and 52*a* permanently engaging the non-conducting ring 11. As can be seen from the drawings, the carry contact 51 extends through the non-conducting ring 11 at a position at which it is displaced along the axis of the ring in relation to the number-indicating contact 37 and when engaged by its pair of brushes 52 and 52*a* it conditions an electrical switching means to memorize a carry to be effected to the counter unit of next higher denomination.

The switching means for memorizing carries is provided because numbers sensed from different columns of a record card are, as stated above, transmitted in parallel to the counter units and carries are effected by carry pulse-initiating means in the interval during which no contact element 53, Figs. 1 and 2, on a disc 54 is operative to initiate a number-indicating pulse to a solenoid 32. The disc 54 is carried by a shaft 55 for continuous rotation therewith, the shaft 55 being rotated by gear wheels 56, 57, of which the gear wheel 57 meshes with the gear wheel 17. The discs 54 carry, considered from right to left of Fig. 1, progressively increasing numbers of contacts 53, thus the disc 54 at the extreme right of the figure is provided with one contact 53 and that at the extreme left is provided with eleven contacts 53. The contacts 53, as disc 54 rotates, successively engage a contact 58 which is connected by lines 59 to the solenoids 32. Thus the discrete pulses to the solenoids 32 pass thereto along the lines 59, see Fig. 5. The interval during which carries are effected is indicated in Fig. 2 by the peripheral portion C of the disc 54. It will be understood that a carry may occur during the entry of a number to a counter unit, for example the unit may register "7" and the next digit may be "5" thus, assuming the counter unit to be a decimal unit, a carry should occur after the third of the five discrete pulses because after application of the fifth pulse to the counter unit, the unit will register "2."

The carry brushes 52 and 52*a* for one counter unit are connected by a line 60, Fig. 6, to a memory switch operating moving coil solenoid 61, Figs. 1, 2, 5, and 6, for the counter unit of next higher denomination. When a pulse along line 60 energises the coil 61 to which it is connected, the armature 62, Fig. 2, for the coil moves a trip wire 63 to the left as viewed in Fig. 2, thus rocking a memory switch latch 64 counter-clockwise about its pivot 65 and against the action of a spring 66 to release a leaf spring 67 supporting a memory switch contact 68 for engagement by a rotatable switch contact 69 which comprises the carry pulse-initiating means. The switch contact 67 is carried by a carry switch disc 70 mounted on the shaft 18 for continuous rotation therewith and, as can be seen from Fig. 1, there is a disc 70 with its contact 69 for each of the counter units. From Fig. 1 it will also be seen that the contacts 69 are connected by lines 71 with a carry actuating switch disc 72 common thereto, the disc 72 carrying a conact 73 for cyclic engagement with a stationary contact 74 carried by a leaf spring 75.

A carry memory switch restoring member 76, Fig. 2, formed of electrically non-conducting material, is carried by the carry switch disc 70 for movement therewith in succession to the switch element 69, the restoring member 76 being operable to engage the switch element 69 and to depress it so that the free end of the spring 67 slides downwards over the sloping surface 77 of switch latch 64 until the latch, owing to the action of spring 66, is again located in latching relation with leaf spring 67.

The contact 68 is connected by a line 78 and a carry isolating switch 79, Fig. 6, with the appropriate in-put line 59 to the solenoid 32 of next higher denomination. Thus if contact 68 of the lower denomination is conditioned to memorize a carry during the carry period C, it will be engaged by the rotary contact 69 and a discrete pulse will pass along line 78 to energize solenoid 32 for the counter unit of next higher denomination so that a unit number-indicating pulse is registered therein, such unit pulse being representative of the carry from the counter unit of next lower denomination.

There is a carry isolating switch 79 for each counter unit and the switches 79 are normally open. The carry isolating switches are shown diagrammatically in Fig. 6 but, as can be seen from Fig. 1, each switch is a rotary switch formed by an isolating switch disc 80 secured to the shaft 18 for continuous rotation therewith. The disc 80 is of non-electrically conducting material but has on the periphery thereof an electrical contact 81 which makes an electrical communication with an isolating contact 83, Fig. 2, carried by a leaf spring 84. It will be understood that the contacts 81, 82 form the switch 79. As can be seen from Fig. 1, the contact 81 engages its contact 82 slightly in advance of the carry pulse initiating contacts 69 being moved to the positions thereof at which they can co-operate with their contacts 68 if the latter are conditioned to memorize a carry. Accordingly, it will be understood that when the carry isolating switches 79 close, a carry pulse passing along line 78 is permitted to pass to the solenoid 32 for the counter unit of next higher denomination.

It may happen that when a carry pulse is imparted to solenoid 32, the counter unit actuated thereby is already standing on its maximum so that on application of a further pulse to the unit a carry will have to be effected to the counter unit of next higher denomination. It will be understood that the condition of "standing-on-maximum" occurs when a decimal counter unit stands on "9," a duo-decimal counter unit stands on "11," or a binary, for example a tens-of-shillings, counter unit stands on "1." To accommodate the carries which must be effected in such circumstances, the non-conducting ring 11 also has inserted in it a "standing-on-maximum" contact 85, Fig. 3, extending radially through the non-conducting ring 11 at a position at which it is displaced along the axis of the rings in relation to the contacts 37 and 51. "Standing-on-maximum" brushes 86 and 86a permanently engage the ring 11 to make electrical contact with the contact 85 when the latter is moved by the ring 11 to the position thereof indicative of a carry to be effected to the counter unit of next higher denomination on receipt of a further number-indicating pulse by the solenoid 32 therefor received from a carry pulse initiated by contact 68. From Fig. 6 it will be seen that the line 78 along which a carry pulse passes is connected to a line 87 joining the "standing-on-maximum" brushes 86, 86a of a counter unit and the carry isolating switch 79 through which a carry pulse passes to the counter unit of next higher denomination. Thus, if a carry pulse is received by counter unit CU2 when that unit is registering "9," the standing-on-maximum switch 85, 86, 86a of counter unit CU2 will be closed and the carry pulse will accordingly energize solenoid 32 for counter unit CU2, thereby adding "1" to that unit and will simultaneously pass through the closed "standing-on-maximum" switch formed by the contact 85 and brushes 86, 86a of the carry-isolating switch 79 to the left thereof so that the same carry pulse is also caused to energize the solenoid 32 for the counter unit CU3.

It will be understood that when a carry of this character is effected there can be no "feed-back" to the counter unit of next lower denomination because at such time it is not possible for the counter unit of next lower denomination also to be "standing-on-maximum" and therefore the "standing-on-maximum" switch 85, 86, 86a for the counter unit of next lower denomination is open.

As can be seen from Fig. 6, the counter unit CU5 is connected with the counter unit CU1 which is the unit of lowest denominational order by a line 88 which constitutes what is known in the art as an "end-around carry," the purpose of which is to permit subtraction to be effected by the addition of complements.

In the foregoing description there has been described one form of accumulator embodying a "standing-on-maximum" switch and associated elements as described herein but it will be understood that the apparatus described herein for accommodating the said "standing-on-maximum" condition may be embodied in other forms of electrical accumulators which comprise a plurality of rotatable denominational counter units arranged to receive discrete digit-representing pulses entered in parallel into the respective units and the accumulator described herein represents only one kind of electrical accumulator to which a carry system as described herein can be applied.

We claim:

1. An electrical accumulator comprising a plurality of rotatable denominational counter units, a moving coil solenoid for each counter unit to receive discrete digit-representing pulses entered in parallel into the respective units and to effect stepwise movement of its counter unit, a carry circuit connecting each unit with the unit of next higher denomination, a continuously rotatable carry actuating switch electrically connected with a source of electrical energy and operable in succession to a digit-entering operation to apply a carry pulse simultaneously to all carry circuits conditioned for a carry operation, a standing-on-maximum switch included in the carry circuit to each said unit and operable by rotation of the unit of next lower denomination to condition the carry circuit to receive a carry pulse when during the application of the carry pulse said unit of next lower denomination is moved from the standing-on-maximum registering condition thereof to the zero registering condition thereof, a plurality of carry switch discs, one for each counter unit, rotatable with said carry actuating switch, a carry memory switch in the carry circuit for each counter unit to be conditioned by its counter unit to memorise a carry when during the application of digit-representing pulses to the solenoid for the counter unit the unit is moved from the maximum registering condition thereof to the zero registering condition thereof whereby on application of the carry pulse a discrete pulse is applied through the memory switch to the counter unit actuating solenoid of next higher denomination to effect the addition of a unit digit to said counter unit of next higher denomination, a support for each carry memory switch to resiliently urge the switch towards the carry switch appropriated thereto, a memory switch latch resiliently urged towards the support normally to engage the support and render the memory switch inactive in relation to its carry switch disc, and a memory switch operating moving coil solenoid electrically connected with a carry brush cooperating with the counter unit to activate the solenoid when during application of digit-representing pulses to the counter unit the unit passes from the maximum registering condition thereof to the zero registering condition thereof thereby to move the memory switch latch out of engagement with its co-operating resilient support.

2. An electrical accumulator according to claim 1, wherein a memory switch restoring member is movable with the carry switch disc to restore the memory switch to the latched inactive position thereof.

3. An electrical accumulator according to claim 2, including a carry isolating switch for each carry switch disc, said carry isolating switch comprising an isolating switch disc rotatable with its carry switch disc, an isolating contact in the carry circuit for each counter unit, and a circuit closing contact carried by the isolating switch disc for co-operation with its isolating contact slightly in advance of the movement of said carry switches to the positions thereof at which they will co-operate with active ones of said carry memory switches.

4. An electrical accumulator comprising a continuously rotatable first shaft, a plurality of denominational registering discs freely mounted on said shaft, a friction clutch for each said registering disc to couple the disc to the shaft for angular movement therewith, an electrically operated escapement device for each said disc to control angular movement thereof by successive predetermined increment from a datum position thereof, said incremental movements being initiated by electrical number-representing impulses and terminated mechanically, a plurality of number-representing impulse-initiating discs, electrical brushes co-operating with said impulse-initiating discs and electrically connected with the escapement device for each registering disc, a second shaft continuously rotatable in timed relation with said first shaft and supporting the impulse-initiating discs for simultaneous angular movement therewith, a selector device for each escapement device selectively to connect the escapement device to one of said impulse-initiating discs thereby to determine the number of successive number-representing impulses to be applied to the escapement device, a carry circuit connecting each disc with the disc of next higher denomination, means operative in succession to a number-entering operation to apply a carry pulse simultaneously to all carry circuits conditioned for a carry operation, and a standing-on-maximum switch included in the carry circuit to each said disc and operable by rotation of the disc of next lower denomination to condition the carry circuit to receive said carry pulse when during the application of the carry pulse said disc of next lower denomination is moved from the standing-on-maximum registering condition thereof to the zero registering condition thereof.

5. An accumulator according to claim 4, wherein the escapement device includes a toothed wheel secured to its registering disc for angular movement therewith a freely pivoted bell-crank having a tooth-engaging arm and a restoring arm, a spring engaging said restoring arm and tending to urge the tooth-engaging arm out of engagement with a tooth of the toothed wheel, a latch spring-urged to engage and retain the tooth-engaging arm in engagement with a tooth of the toothed wheel thereby to restrain the registering disc against angular movement by said first shaft, and a number-entering solenoid the armature of which cooperates with said latch whereby on receipt of a number-representing impulse by the solenoid said latch is tripped thereby out of engagement with said tooth-engaging arm to permit angular movement of the registering disc by said first shaft, said restoring arm being engaged by a tooth of the toothed wheel and rocked thereby to restore the tooth-engaging arm to the latched position thereof on movement of the registering disc by an increment of one tooth pitch of the toothed wheel.

6. An accumulator according to claim 5, including electrical switching means in the carry circuit for each said disc to memorize a carry from one registering disc to the registering disc of next higher denomination when the carry occurs during the application of number-representing impulses to the escapement device of lower denomination, and carry impulse-initiating means operable to register a memorised carry during a period when no impulse-initiating disc is operative to initiate a number-representing impulse.

7. An accumulator according to claim 6, wherein each registering disc comprises an electrically conducting ring, an electrically non-conducting ring co-axial with the conducting ring, a number-indicating contact electrically connected to said conducting ring and extending radially through the non-conducting ring, a read-out brush for each position of register of the registering disc, each said read-out brush being resiliently urged towards said non-conducting ring interrupter means operative normally to restrain said brushes against co-operation with said non-conducting ring, a carry contact electrically connected with said conducting ring and extending radially through the non-conducting ring at a position at which it is displaced along the axis of the ring in relation to the number-indicating contact, a carry brush electrically connected with said switching means and permanently engaging the registering disc to make electrical contact with the carry contact when the latter is moved by the disc to the position of register thereof indicative of a carry to be effected to the registering disc of next higher denomination, and an output brush permanently engaging said conducting ring and electrically connected to an actuating device appropriated thereto.

8. An accumulator according to claim 7, wherein the electrical switching means includes a memory switch electrically connected with the number entering solenoid of next higher denomination, a memory switch support resiliently urging the memory switch towards said carry impulse-initiating means, a memory switch latch resiliently urged towards the switch support to render the memory switch inactive in relation to the carry impulse-initiating means, and a memory switch operating solenoid electrically connected with said carry brush and having its armature arranged to co-operate with the memory switch latch whereby when the carry brush engages the carry contact the memory switch operating solenoid trips the memory switch latch to release the memory switch for movement by its support to its active position for co-operation with the carry impulse-initiating means.

9. An accumulator according to claim 8, wherein the carry impulse-initiating means comprises a carry switch disc, a third shaft rotatable in timed relation with said first and second shafts and supporting all carry switch discs for simultaneous rotation therewith, a switch element carried by said carry switch disc for co-operation with said memory switch when the latter is in the active position thereof, a carry actuating switch rotatable with said third shaft and electrically connected with each said switch disc, and a carry switch member for electrical connection with a source of electrical energy and co-operating with said carry switch member to permit the flow of electrical energy to a number-entering solenoid when the memory switch therefor and its switch element are actively engaged.

10. An accumulator according to claim 9, wherein a memory switch restoring member is movable with the carry switch disc in succession to the switch element carried thereby, said restoring member being operable to restore the memory switch to the latched inactive position thereof.

11. An accumulator according to claim 10, including a carry isolating switch for each carry switch disc, said carry isolating switch comprising an isolating switch disc mounted on said third shaft for rotation simultaneously with the carry switch disc with which it co-operates, an isolating contact in the carry circuit to each number-entering solenoid, a circuit closing contact carried by the isolating switch disc for co-operation with its isolating contact, a standing-on-maximum contact electrically connected to said conducting ring and extending through the non-conducting ring at a position at which it is displaced along the axis of the ring in relation to said number-indicating and carry contacts, a standing-on-maximum brush permanently engaging the registering disc to make electrical engagement with the standing-on-maximum contact when the latter is moved by the registering device to the position thereof indicative of a carry to be effected to the disc of next higher denomination on receipt of a further number-indicating impulse by the number entering solenoid therefor, said standing-on-maximum brush being electrically connected with the carry circuit to the digit-entering solenoid of next higher denomination whereby if during a carry period a carry is effected to a registering disc already standing-on-maximum a carry is effected therefrom to the registering disc of next higher denomination.

References Cited in the file of this patent

UNITED STATES PATENTS

| | | |
|---|---|---|
| 1,372,965 | Lake | Mar. 29, 1921 |
| 2,424,322 | Luhn | July 22, 1947 |
| 2,471,150 | Goodale et al. | May 24, 1949 |
| 2,608,346 | Hopkins | Aug. 26, 1952 |